United States Patent [19]

Roth

[11] Patent Number: 4,507,130

[45] Date of Patent: Mar. 26, 1985

[54] STAGGERED METHOD CLEANING CYCLE FOR FABRIC FILTER SYSTEM INCLUDING MULTIPLE-BAGHOUSES

[75] Inventor: Alfred H. Roth, Annville, Pa.

[73] Assignee: General Electric Environmental Services, Inc., Lebanon, Pa.

[21] Appl. No.: 477,566

[22] Filed: Mar. 21, 1983

[51] Int. Cl.³ .............................................. B01D 46/04
[52] U.S. Cl. ........................................ 55/96; 55/283; 55/284; 55/341 MC
[58] Field of Search .................... 55/96, 160, 283, 284, 55/341 M, 341 MC, 341 PC

[56] References Cited

U.S. PATENT DOCUMENTS

| | | | |
|---|---|---|---|
| 1,907,197 | 5/1933 | Dorfan | 55/273 |
| 3,097,936 | 7/1963 | Lincoln | 55/273 |
| 3,212,237 | 10/1965 | Wright | 55/96 |
| 3,390,512 | 7/1968 | Hanes | 55/96 |
| 3,411,929 | 11/1968 | Garrett | 106/307 |
| 3,630,004 | 12/1971 | Adair et al. | 55/273 |
| 3,735,566 | 5/1973 | Laliwala | 55/273 |
| 3,898,062 | 8/1975 | Slakey | 55/269 |
| 4,113,449 | 9/1978 | Bundy | 55/96 |
| 4,277,255 | 7/1981 | Apelgren | 55/20 |
| 4,292,053 | 9/1981 | Remillieux | 55/96 |

Primary Examiner—Charles Hart
Attorney, Agent, or Firm—Ernest F. Chapman

[57] ABSTRACT

A method for controlling the cleaning of multiple-baghouse fabric filter systems. Each baghouse includes a plurality of compartments and a cleaning system of a type which cleans the compartments in a compartment-by-compartment sequence and which allows all compartments not being cleaned to maintain the baghouse on-line even during a cleaning operation. The particular cleaning system disclosed more particularly is of the reverse gas flow type. A normal characteristic of reverse gas flow cleaning is that system pressure drop goes through sequential peaks and minimums. In the systems disclosed herein, the cleaning cycles of the individual baghouses are staggered in a manner such that the peak resistance during cleaning of one baghouse does occur at the same time as a lower and offsetting resistance of another baghouse. Thus, peak pressure drop of the system as a whole is reduced. Moreover, the difference in pressure loss from peak to minimum is reduced.

1 Claim, 8 Drawing Figures

STAGGERED METHOD CLEANING CYCLE FOR FABRIC FILTER SYSTEM INCLUDING MULTIPLE-BAGHOUSES

BACKGROUND OF THE INVENTION

The present invention relates generally to systems and methods for controlling the cleaning of industrial filter systems, such as textile barrier filters of the bag filter types, including a plurality of filter houses, such as a plurality of industrial baghouses.

Baghouses are employed, for example, for air pollution control purposes to separate undesirable particulate matter from a gas stream, such as a boiler flue gas stream, by fabric filtration. Fabric filtration is however not limited to air pollution control, but also is employed in resource recovery applications where an object is to recover the particulate matter.

Such filtration is carried out in filter houses, known in the trade as baghouses, which include a plurality of fabric bag filters suspended, generally open-end down, within the baghouse. Particulate-laden gas is directed upwardly into each bag such that particulate matter collects inside the bags as a filter cake. Gas is forced to flow through the baghouse by either a blower fan or a suction fan, and accordingly there is a pressure drop across the filters depending upon their resistance to gas flow. As a filter cake accumulates on the bag surfaces, gas flow resistance increases, decreasing gas flow and increasing pressure drop, which must then be overcome by the fan. Accordingly, the bag filters are periodically cleaned to remove the accumulated filter cake.

At the outset, it should be noted that terminology in this particular art is not completely standardized, and what are in fact different elements are sometimes referred to by the same name. For convenience and clarity, the terminology employed herein will now be defined in the context of a description of the overall organization of a multiple baghouse fabric filter system.

A singe "baghouse", which is also referred to more generically herein as a "filter house", comprises one or more "compartments". Each "compartment" is an independent structure, and is normally separated from other compartments within the same baghouse by walls, and is controllably separated from common inlet and outlet gas ducts by dampers. Each compartment in turn includes multiple bags, typically arranged in rows and columns. One or more baghouses (or, more generically, filter houses) together comprises a "fabric filter system". When more than one baghouse is employed in a fabric filter system, the individual baghouses are connected in parallel in the gas stream. Various prior art descriptions of baghouses apply such terms as fabric filter, bag filter, or collector, which terms are not employed herein. Similarly, various prior art descriptions of what are herein referred to as "compartments" apply such terms as collectors, baghouses, modules, or units, which terms are also not employed herein.

By way of example, the following U.S. patents are identified for their disclosures of various forms of baghouses of the type here concerned: Lincoln U.S. Pat. No. 3,097,936; Garrett U.S. Pat. No. 3,411,929; Adair et al U.S. Pat. No. 3,630,004; Laliwall U.S. Pat. No. 3,735,566; Slakey Pat. No. 3,898,062; Bundy U.S. Pat. No. 4,113,449; and Apelgren U.S. Pat. No. 4,277,255. A related system, which employs a combination settling chamber and wire screen, rather than a bag filter, is disclosed in Dorfan U.S. Pat. No. 1,907,197.

As noted above, as a bag filter removes particulate, a dust cake develops on the surface of the filter fabric. Hence, as filtering proceeds, the filter resistance and thus pressure drop increases. Periodic cleaning is therefore necessary.

In order to maintain a baghouse in operation even while cleaning is taking place, it is conventional practice to provide a cleaning cycle whereby individual compartments within a baghouse are cleaned one at a time, while the remaining compartments of the baghouse remain on-line to continue filtering operation. The compartment being cleaned is taken off-line by the closing of appropriate dampers connecting the compartment being cleaned to the common inlet duct, the common outlet duct, or both. After each compartment is cleaned, it is then returned on-line, and the next compartment in sequence is cleaned, and so on, until all compartments of the bag house have undergone a cleaning cycle.

As will hereafter become apparent, the present invention is applicable to various types of cleaning methods, but the cleaning method with which the invention is most directly concerned is known as reverse air or reverse gas flow cleaning. Reverse air cleaning uses a sustained period of low velocity, high volume gas flow within the compartment being cleaned, which flow is opposite to the normal flow of particulate-laden gas. All the bags in an entire compartment are cleaned simultaneously by this method. Of the various prior art patents identified above, reverse air cleaning is disclosed in the patents to Lincoln No. 3,067,936, Garrett No. 3,411,929, Adair et al No. 3,630,004, nd Slakey No. 3,898,062.

While the method of reverse gas flow cleaning is described hereinafter in greater detail, at this point it may be noted that forced reverse gas flow during cleaning opposes the main gas flow through the system, and thus adds, during a portion of the cleaning cycle, even more pressure drop or resistance than is caused by filter cake accumulation alone. Thus, as a normal and essential part of a reverse gas flow cleaning cycle, system pressure drop goes through sequential peaks and minimums. Not only must the system blower be sufficiently sized to handle the peak pressure drop, but care must be taken to ensure that proper fan operation is not disrupted by the magnitude or rapidity of pressure drop changes.

Briefly, two other known general cleaning methods are "pulse jet cleaning" and "Shaker cleaning". "Pulse jet cleaning" employs a high-pressure burst of a compressed gas to literally blow the dust off the bags. Typically, one row of bags is cleaned at a time, and the cleaning of the various compartments is usually done independently. By way of example, of the various prior art patents listed above, forms of pulse jet cleaning are disclosed in the U.S. patents to Laliwala No. 3,735,566, Bundy No. 4,113,449, and Apelgren No. 4,277,255.

"Shaker cleaning" employs mechanical agitation of the bags. Usually, two or more rows of bags are cleaned simultaneously, and compartments are usually cleaned independently. By way of example, the system of the Garrett Pat. No. 3,411,929, identified above, employs mechanical shaking, in addition to reverse air flow, to remove accumulated particulate.

The present invention may also be employed with advantage in combination with either "pulse jet cleaning" or "shaker cleaning". In cases where the inlet dampers, the outlet dampers, or both, for a particular compartment being cleaned are closed, the resistance characteristics of a baghouse using these two cleaning methods are similar to those of a baghouse employing reverse air cleaning. The present invention can be employed with similar results.

In the context of the present invention, the definition of a "baghouse" or, more generically, a "filter house" as defined at the outset above may more specifically be defined, in the context of function, as a set of compartments served by a single cleaning system, e.g., of the reverse air flow type, and which typically is cleaned compartment-by-compartment in a predetermined sequence until all compartments of the baghouse have been cleaned. Thus, there are baghouses which include several physically-distinguishable units which might be termed individual baghouses, but yet are operated as one in that the compartments are all served by the same cleaning system and are cleaned individually in a compartment-by-compartment sequence until all are cleaned. Such an arrangement, for present purposes, is nevertheless considered to be a single baghouse. This definition of a baghouse in the context of cleaning function is important for best appreciation and understanding of the present invention.

Various methods have previously been employed for initiating a baghouse cleaning cycle to clean the individual compartments compartment-by-compartment. In cases wherein the rate of particulate accumulation is sufficiently predictable, simpler timer-based systems have been employed.

More typically, pressure drop across the system is monitored, either automatically or by an operator, and each baghouse cleaning cycle is triggered when the pressure drop reaches or exceeds a threshold. In a multiple baghouse system, all baghouses are parallel to each other. Thus, although pressure sensors may be located at individual baghouses, the pressure sensors necessarily respond to total system pressure drop, and the baghouse cleaning cycles are all triggered at approximately the same time as the triggering threshold is reached. When the first baghouse to actually reach the pressure drop threshold begins its cleaning cycle, the first of its compartments going off-line immediately causes the pressure drop across the other bag houses to increase, immediately causing their triggering thresholds to be exceeded.

In other systems, the baghouses have been operated entirely independently, with no attempt to coordinate their cleaning cycles as in an oveall fabric filter system.

SUMMARY OF THE INVENTION

It is an object of the invention to optimize the cleaning of a fabric filter system to minimize pressure loss.

It is another object of the invention to provide a fabric filter system and methods of operation which minimize variations in overall system pressure loss during operation, thereby resulting in more stable boiler or system fan operation.

It is yet another object of the invention to provide a fabric filter system and methods of operation which result in a lower peak pressure loss compared to prior art systems.

Briefly, and in accordance with another concept of the invention, in a multiple baghouse system the cleaning cycles of the individual baghouses are initiated at times, with respect to each other, which ensure optimum operation of the system.

More particularly, in accordance with the invention, the cleaning cycles of the individual baghouses are staggered in a predetermined manner such that the peak of each baghouse resistance occurs at the same time as a lower resistance of another baghouse. Since peak resistances are offset, the peak pressure drop is reduced.

More particularly, in accordance with one aspect of the invention, a fabric filter system comprises a plurality of filter houses, such as baghouses. Each baghouse is arranged to receive particulate-laden gas from a source. Each baghouse in turn includes a common inlet manifold and a plurality of individual filter compartments each having an inlet duct for receiving particulate-laden gas from the common inlet manifold, an outlet duct for delivering filtered gas, a filter element between the inlet and outlet ducts, and a damper system for selectively blocking at least one of the ducts for taking the compartment off-line while other compartments of the particular baghouse remain on-line. Each baghouse also includes a cleaning system common to the compartments of the particular baghouse. The common cleaning system is capable of being initiated to execute a baghouse cleaning cycle and is operable during a baghouse cleaning cycle to clean the filter elements in a compartment-by-compartment sequence wherein each compartment being cleaned is off-line while other compartments are on-line. The filter system additionally includes a control system, common to all of the baghouses, operable for initiating the cleaning cycles of individual baghouses at different times such that the baghouse cleaning cycles are staggered.

In one form of staggering, such as in a system comprising two baghouses, the durations of the individual baghouse cleaning cycles and the times at which the cleaning cycles are initiated are such that the individual cleaning cycles of the baghouses occur at non-overlapping times. For example, when operating at full capacity, the cleaning cycles may alternate in time, one beginning when the other has concluded.

In another form of staggering, for example where a fabric filter system comprises three baghouses, the individual cleaning cycles of the baghouses overlap in time, with the common control system operable to initiate the cleaning cycle of each succeeding baghouse following a delay at least approximately equal to one-third the duration of a baghouse cleaning cycle.

In accordance with a more particular aspect of the invention, the individual baghouse cleaning systems are of the revere gas flow type and include a source of reverse gas flow, dampers to control the introduction of reverse gas into each compartment, and controllable dampers in the outlet ducts. The cleaning systems are operable during a cleaning sub-cycle to clean an individual compartment by, in sequence, closing the compartment outlet duct damper to take the compartment off-line, opening the reverse gas damper to direct reverse gas flow through the filter element and out through the inlet duct into the common inlet manifold closing the reverse gas damper to remove reverse gas flow while maintaining the compartment outlet damper closed for a settling time interval, and then opening the outlet duct damper to put the compartment back on-line. As a result, during a cleaning sub-cycle for cleaning a compartment, the effective gas flow resistance of an individual filter house reaches a peak when reverse gas flow is directed into the common inlet manifold in opposition to the main gas flow through the system, and then the effective gas flow resistance decreases when reverse gas flow is removed during the settling time interval. Finally, when the compartment is put back on-line, the effective gas flow resistance of an individual filter house decreases to a value less than the gas flow resistance prior to the cleaning operation.

With this type of cleaning system, the common control system of the present invention advantageously initiates the cleaning cycles of individual filter houses at times which ensure that the time of peak gas flow resistance of one baghouse does not coincide with the time of peak gas flow resistance of another baghouse.

BRIEF DESCRIPTION OF THE DRAWINGS

While the novel features of the invention are set forth with particularity in the appended claims, the invention, both as to organization and content, will be better understood and appreciated from the following detailed description taken in conjunction with the drawings, in which:

DETAILED DESCRIPTION

Figure 1:
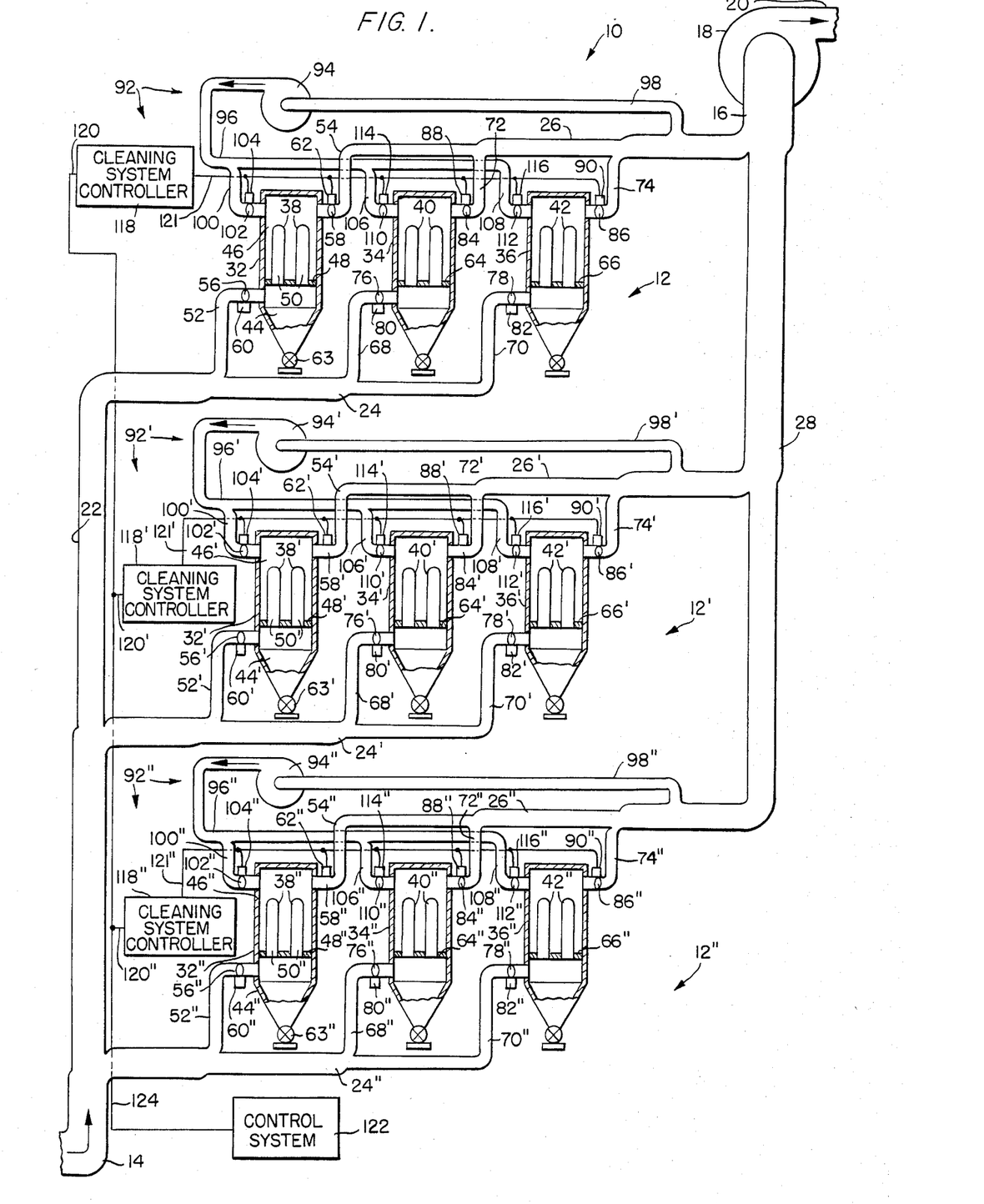
FIG. 1 is a schematic depiction of an overall bag filter system including three baghouses, each baghouse including three compartments.

Referring first to the highly schematic depiction of FIG. 1, an overall fabric filter system 10 of the multiple baghouse type includes, for purposes of example, three individual filter houses or, more specifically, baghouses, respectively designated 12, 12' and 12". The filter system 10 receives a particulate laden gas stream from a source of such gas via an inlet duct 14. For example, the particulate-laden gas stream may comprise boiler flue gas. The fabric filter system 10 discharges filtered gas via an outlet duct 16. The particular filter system 10 illustrated is a suction or induced draft system, and accordingly includes a high-capacity fan blower 18 connected to the outlet duct 16 for forcibly drawing gas through the entire system 10, and discharging gas at a blower outlet 20. It will be appreciated that the invention is equally applicable to a pressure system (not shown) wherein the blower is located at any suitable point upstream of the baghouses.

The inlet duct 14 is connected to an inlet manifold 22 common to the entire system 10, which manifold 22 in turn supplies individual inlet manifolds 24, 24' and 24" of the respective individual baghouses, 12, 12' and 12". The individual baghouses 12, 12' and 12" have respective individual outlet manifolds 26, 26' and 26" supplying an outlet manifold 28 common to the entire system 10 and connected to the outlet duct 16.

Considering representative baghouse 12 in greater detail, the baghouse 12 includes, for purposes of example, three individual filter compartments 32, 34 and 36. It will be appreciated, however, that baghouses in practice typically include many more compartments than is suggested by the FIG. 1 representation. By way of example, an actual baghouse might typically comprise four to twenty individual compartments.

Within the compartments 32, 34 and 36 are respective fabric filters, such as representative bag filters 38, 40 and 42. For convenience of illustration, only two bag filter elements 38, 40 or 42 are shown in each of the compartments 32, 34 and 36. In actual baghouse compartments there are multiple bags arranged in rows and columns.

Considering representative compartment 32 in detail, the compartment 32 is partitioned into a lower (unfiltered) sub-compartment 44 and an upper (filtered) sub-compartment 46 by a representative flange-like plate 48 securing the open end of the filter bags 38 and having openings 50 through which particulate-laden gas is directed into the filter bags 38. The compartment 32 has an inlet duct 52 connected to the inlet manifold 24 for receiving particulate-laden gas into the lower (unfiltered) sub-compartment 44, and an outlet duct 54 for delivering filtered gas from the upper (filtered) sub-compartment 46 into the outlet manifold 26. Controlled dampers 56 and 58 are provided respectively in the inlet duct 52 and the outlet duct 54 for controllably and selectively blocking the inlet and outlet ducts 52. Illustratively, the dampers 56 and 58 have operators 60 and 62, respectively, which, for example, can be electric, pneumatic or hydraulic. A valve 63 is provided for emptying particulate which accumulates in the lower sub-compartment 44 as a result of cleaning operations.

The damper 56 in the inlet duct 52 and the damper 58 in the outlet duct 54 thus constitute a system for taking the representative compartment 32 off-line, e.g. for cleaning, while the other two compartments 34 and 36 of the bag house 12 remain on-line. It will further be appreciated that the representative compartment 32 is taken off-line even if either of the dampers 56 or 58 alone is closed, inasmuch as there is no longer a continuous air flow path through the representative compartment 32 from the inlet manifold 24 to the outlet manifold 26.

In substantially identical fashion, the other two representative compartments 34 and 36 include respective flange-like partitioning plates 64 and 66, inlet ducts 68 and 70 receiving particulate-laden gas from the inlet manifold 24, and respective outlet ducts 72 and 74 delivering filtered gas to the outlet manifold 26. Included in the inlet ducts 68 and 70, respectively, are dampers 76 and 78 operably connected to suitable operators 80 and 82. Similarly, dampers 84 and 86 included in the outlet ducts 72 and 74 are operably connected to suitable operators 88 and 90.

The other two baghouses 12' and 12" are configured in substantially identical fashion, and elements in the bag house 12' and in the baghouse 12" corresponding to elements in the baghouse 12, as described above, are designated with primed and double-primed reference numerals, and the detailed description thereof is not being repeated.

A significant inclusion in each of the baghouse 12, 12' and 12" is a cleaning system, the three cleaning systems respectively being generally designated 92, 92' and 92".

The cleaning systems 92, 92' and 92" are of the reverse gas flow type, and each includes a source of reverse gas flow. In the exemplary filter system 10 of FIG. 1, each of the cleaning systems 92, 92' and 92" includes a dedicated reverse gas blower 94, 94' or 94" supplying pressure to a reverse gas flow manifold 96, 96' or 96", with gas being drawn from the outlet manifold 26, 26' or 26" via an auxiliary duct 98, 98' or 98'". However, it will be appreciated that numerous variations are possible. For example, a multiple-baghouse filter system can also be designed which includes only a single reverse gas blower supplying a single reverse gas flow manifold and, in such case, the identifiable parts of the cleaning systems 92, 92' and 92" of the cleaning systems for the baghouses 12, 12' and 12" would simply comprise connections to this single reverse gas flow manifold. As another example, reverse gas can come from another source entirely, which may even be ambient air.

Considering the exemplary cleaning system 92 of the bag house 12, in order to direct reverse gas flow through representative bag filter elements 38 in the compartment 32, the cleaning system 92 includes a duct 100 and a controllable damper 102 for selectively directing revers gas pressure from the manifold 96 into the upper (filtered) sub-compartment 46 of the representative compartment 32. The damper 102 is driven by a suitable operator 104. In general, to effect reverse gas flow cleaning of a single compartment, such as a representative compartment 32, the damper 58 in the outlet duct 54 is closed, taking the compartment 32 off-line. The inlet damper 56 remains open. When the reverse gas flow damper 102 is opened, the upper sub-compartment 46 is pressurized, directing reverse gas flow through the filter bags 38 and out through the duct 52, which duct 52 normally serves as n inlet duct. This reverse gas flow then flows through the inlet manifold 24 into the other two compartments 34 and 36 remaining on-line. It will be appreciated that this reverse gas flow is in the opposite direction to the main gas flow forced by the fan 18, and thus increases the total effective pressure drop across the filter system, as is described hereinbelow in greater detail with reference to FIG. 2.

The cleaning system 92 also includes similar reverse gas flow ducts 106 and 108 and controllable dampers 110 and 112 for selectively directing reverse gas pressure into the upper sub-compartments of the compartments 34 and 36, when these compartments are to be cleaned. The dampers 110 and 112 are similarly operated by suitable operators 114 and 116.

The final element of the cleaning system 92 is a cleaning system controller 118, which may alternatively comprise either a controller dedicated exclusively to the cleaning system 92 of the particular bag house 12, or may comprise merely a functional element of an overall controller for the entire filter system 10. As will be appreciated by those skilled in the control art, for any particular control function which may be defined, a wide variety of specific control systems can be designed, having a variety of actual implementations. For example, the controller 118 may range in complexity from a simple mechanical timer to a computer-based system.

In any event, the representative functional cleaning system controller 118 has a representative trigger input 120 which, when activated, initiates a compartment-by-compartment cleaning sequence within the baghouse 12 wherein one of the compartments 32, 34 and 36 is off-line, while the other two compartments remain on-line. After the first compartment has been cleaned, the second one begins cleaning, until the sequence is completed, whereupon the sequence may immediately be re-initiated and be repeated, or may be initiated at a later time. This compartment-by-compartment cleaning sequence is effected by a control connection, represented by a line 121, from the controller 118 to the damper operators 62, 88, 90, 104, 114 and 116.

The other two cleaning systems 92' and 92" for the bag houses 12' and 12", respectively, have corresponding elements, designated by primed reference numerals.

Finally, the FIG. 1 cleaning system 10 includes an overall control system 122, common to all three representative bag houses 12, 12' and 12", for initiating the cleaning cycles of the invidual bag houses 12, 12' and 12" at different times such that the bag house cleaning cycles are staggered. This control is effected by means of a representative control line 124 connected to the trigger inputs 120, 120' and 120" of the cleaning system controllers 118, 118' and 118". As in the case of the controllers 118, 118' and 118", the control system 122 may range in complexity from a simple mechanical timer to a computer-based system. Moreover, the controllers 118, 118' and 118", and the control system 122, may all be included within the same controller, although a functional line of distinction will remain.

Although not described herein in detail, it will be appreciated that the controllers 118, 118' and 118", and the control system 122 are implemented employing entirely conventional techniques, as the present invention in essence is directed to particular timing sequences applied to otherwise conventional systems. Once the particular timing sequences of the present invention are known, it will be apparent how to modify the control system of virtually any existing multiple-baghouse system to incorporate the present invention. More particularly, the individual cleaning system controllers 118, 118' and 118" are entirely conventional, and each of these controllers 118, 118' and 118" functions merely to direct its associated baghouse 12, 12' and 12" through an entirely conventional cleaning cycle, as summarized hereinbelow with particular reference to FIGS. 2-4. Similarly, the control system 122 may comprise nother more than a timer effective to trigger the individual controllers 118, 118' and 118" at such times in accordance with the invention as are summarized hereinbelow with particular reference to FIGS. 5-8. The control system 122 determines when cleaning is necessary by any suitable technique, such as by monitoring system pressure drop or through manual initiation by an operator, both of which are mentioned hereinabove in the "Background of the Invention" section.

Figure 2:
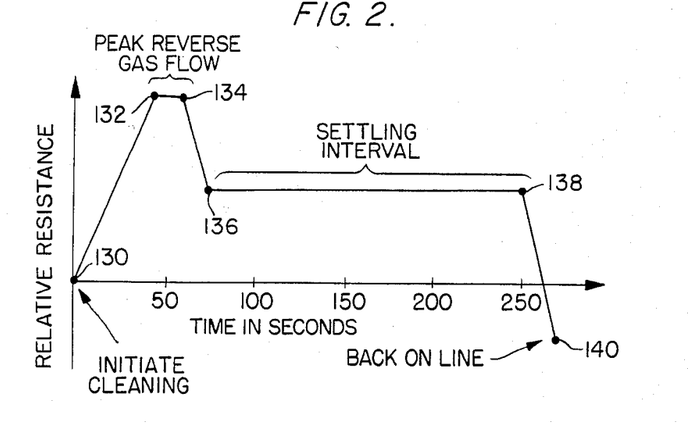
FIG. 2 is a waveform representing effective gas flow resistance as a function of time due to a single compartment undergoing a reverse gas flow cleaning operation.

Referring now to FIG. 2, depicted is a typical operation during a single cleaning sub-cycle to clean an individual compartment. FIG. 2 depicts, as a function of time, relative resistance to gas flow offered by a single compartment being cleaned, as well as controlled events as occurring during the compartment cleaning sub-cycle depicted. It will be appreciated, for example in the case of the FIG. 1 baghouse 12, that for a complete cleaning cycle, the sub-cycle of FIG. 2 is repeated three times in succession, once for each of the compartments 32, 34 and 36.

The compartment cleaning sub-cycle depicted in FIG. 2 for purposes of example has a duration of 4.5 minutes, or 270 seconds. The horizontal axis in FIG. 2 represents time in seconds as the individual compartment cleaning sub-cycle proceeds. The specific times indicated are, as will be appreciated, exemplary only. The vertical axis in FIG. 2 represents changes in relative resistance to gas flow offered by the fabric filter system 10 as a result of the particular compartment being cleaned. Relative resistance may also be viewed as pressure loss through the fabric filter system 10.

Referring to FIG. 2 in detail, the represented compartment cleaning sub-cycle begins at a point 130 at which the relative resistance is at a reference level indicating the bag filters 38 within the compartment 32 have accumulated filter cake to the point where cleaning is necessary. Following the cleaning sub-cycle, the air flow resistance will be less.

At point 130, the cleaning system controller 118 commences the compartment cleaning sub-cycle by closing the damper 58 in the outlet duct 54, thereby taking the compartment 32 off-line. At the same time, reverse gas flow is directed through the bag filter elements 38 by opening the reverse gas damper 102, allowing reverse gas pressure from the manifold 96 to flow into the upper sub-compartment 46, through the filter element 38, and out through the inlet duct 52 into the inlet mainfold 24. Under the influence of reverse gas flow, the filter bag 38 partially collapses, breaking up the accumulated filter cake, which subsequently drops into hoppers comprising the lower sub-compartment 44. In order to minimize transients and shocks to the system, the dampers are not opened and closed instantaneously. Rather, a damper travel time in the order of 15 seconds is employed.

Approximately 45 seconds later, a point 132 is reached, characterized by peak reverse gas flow. Relative resistance is at a peak at this point because reverse gas pressure from the reverse gas blower 94 is actively opposing normal gas flow through the system, and thus adds even more pressure drop or resistance than is caused by filter cake accumulation alone. The condition of peak reverse gas flow is maintained for approximately 15 seconds, until point 134, at which point 134 reverse gas flow is removed by closing the reverse gas damper 102. At this point 134, the reverse gas blower 94 may also be turned off, depending upon other system considerations.

When the reverse gas damper 102 is fully closed, point 136 is reached, which is the beginning of a settling interval to allow time for dust, such as fly ash, to settle into the bottom of the lower sub-compartment 44. During this settling interval, relative air flow resistance as a result of the compartment 32 is at an intermediate value because the compartment 32 is closed off to maing gas flow due to its outlet duct 54 damper 58 remaining closed. The resistance however is no longer at a peak, since reverse gas flow is no longer actively opposing the main flow of gas.

Point 138 represents the conclusion of the settling interval, at which time the compartment 38 is gradually returned on-line by opening the outlet duct 54 damper 58. As is known, a bag filter compartment is typically restored to on-line operation relatively slowly by gradually opening the outlet duct damper 58, to avoid a sudden increase in pressure drop across the fabric filters, which otherwise would result in "popping" of the bags, adversely affecting bag life.

Finally, at point 140, the compartment 32 is back on-line, and, due to the removal of accumulated filter cake, offers a lower resistance to gas flow than at the initial point 130.

Thus, it will be appreciated that, during a cleaning cycle, system pressure loss goes through sequential peaks and minimums as a normal and essential part of the cycle. The blower 18 must be sufficiently sized to handle the peak pressure drop. Moreover, the magnitude or speed of pressure loss changes in some cases causes difficulty in operating fans such as the blower 18.

Figure 3:
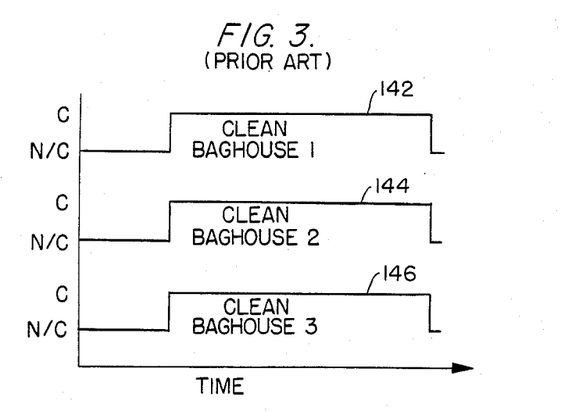
FIG. 3 is a timing diagram depicting the respective durations of the cleaning cycles of three baghouses in a three-baghouse prior art system.

FIG. 3 depicts a typical manner in which a prior art three-baghouse fabric filter system, with eight compartments in each baghouse, is cleaned. The three individual timing diagrams 142, 144 and 146 of FIG. 3 at any given time all depict a not cleaning (N/C) or a cleaning (C) condition. Thus, in the prior art system depicted, the cleaning cycles of all three baghouses are initiated at the same time, and conclude at the same time. Within each of the cleaning cycles 142, 144, and 146 depicted in FIG. 3, the individual compartments of the particular baghouse concerned are cleaned in a compartment-by-compartment sequence as summarized above.

Figure 4:
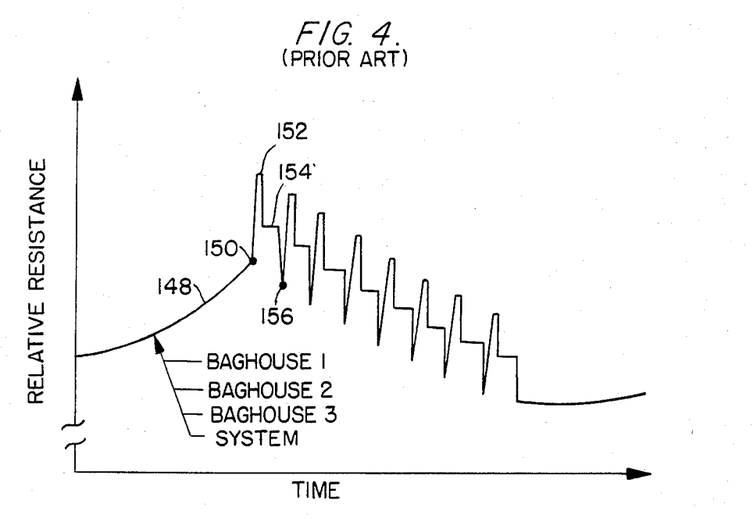
FIG. 4 is a waveform depicting effective system gas flow resistance as a function of time during the cleaning cycles depicted in FIG. 3.

The effect of the prior art cleaning method of FIG. 3 is represented in greater detail in FIG. 4, which depicts relative gas flow resistance or pressure loss of the entire system as a function of time during the cleaning cycle. In this particular case, it is assumed, for purposes of example, that each of the three baghouses being cleaned has eight compartments, and that there are twenty-four compartments in the entire system. Although each of the three baghouses is cleaning its individual compartments compartment-by-compartment, corresponding compartments in the three baghouses are being cleaned simultaneously. In other words, all three baghouse first compartments are cleaned simultaneously, all three baghouse second compartments are cleaned simultaneously, and so on.

Referring to FIG. 4 in detail, the beginning portion 148 of the curve represents an increase in relative resistance or pressure loss in the filter system as filter cake accumulates. At point 150, the cleaning cycles of all three baghouses are triggered, and the relative resistance or pressure loss reaches a first peak at 152 as the three baghouse first compartments reach peak reverse gas flow during the initial part of their cleaning sub-cycles, as described above with reference to FIG. 2. A settling interval is represented at 154. Relative resistance or system pressure loss reaches a momentary peak at 156, which corresponds to the point where the first compartment in each of the three baghouses is returned on-line, fully cleaned, just prior to the start of another cleaning sub-cycle for the second compartment in each of the three baghouses.

Thus, from FIG. 4, it can be seen that the cleaning method depicted in FIG. 3 results in the peak resistances of each of the three baghouses occurring simultaneously. The resultant peak pressure loss of the fabric filter system is maximized. Similarly, the minimum resistances of the baghouses occur simultaneously. With the peaks and minimums occurring simultaneously, the resultant changes in pressure loss are the largest possible.

Figure 5:
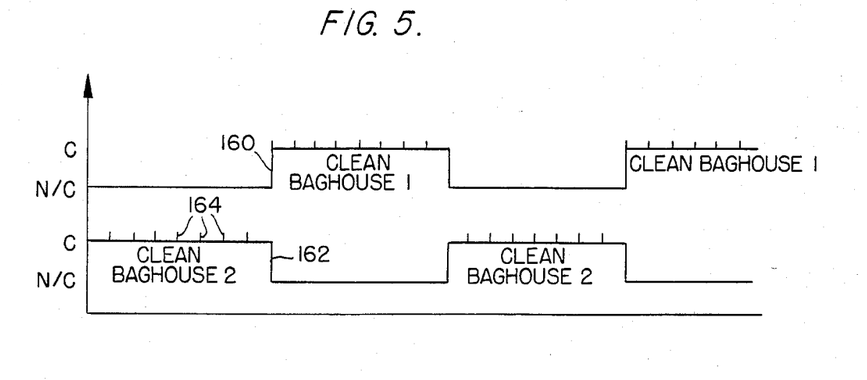
FIG. 5 is a timing diagram depicting the respective durations of the cleaning cycles of each of two baghouses in a two-baghouse system in accordance with the invention.

Referring now to FIG. 5, depicted are the cleaning cycles 160 and 162 of two baghouses in an exemplary two-baghouse filter system embodying the invention. In accordance with the invention, the cleaning cycles of the individual baghouses are initiated at different times, such that the baghouse cleaning cycles are staggered. In the operation of the two-baghouse system depicted in FIG. 5, the cleaning cycles of the two baghouses occur at different, non-overlapping times. For example, in FIG. 5, the cycle arbitrarily begins with a cleaning cycle for the second baghouse; while the first bag house is not cleaning. Pips 164 along the line 162 represent the beginning of each compartment cleaning sub-cycle, as described above with reference to FIG. 2. Thus, the baghouses whose cleaning cycles are represented in FIG. 5, have an exemplary eight compartments each.

The two baghouses illustrated have a 100% "margin", which means that the useful duration of filtering operation between cleaning cycles is at least as great as the duration of a cleaning cycle. During periods of low load operation, the two cleaning cycles need not continuously alternate. Rather, there will be times when all compartments in both baghouses are filtering. It may be noted that this "100% margin" is illustrative only, as such it is not always provided in baghouse systems.

Figure 6:
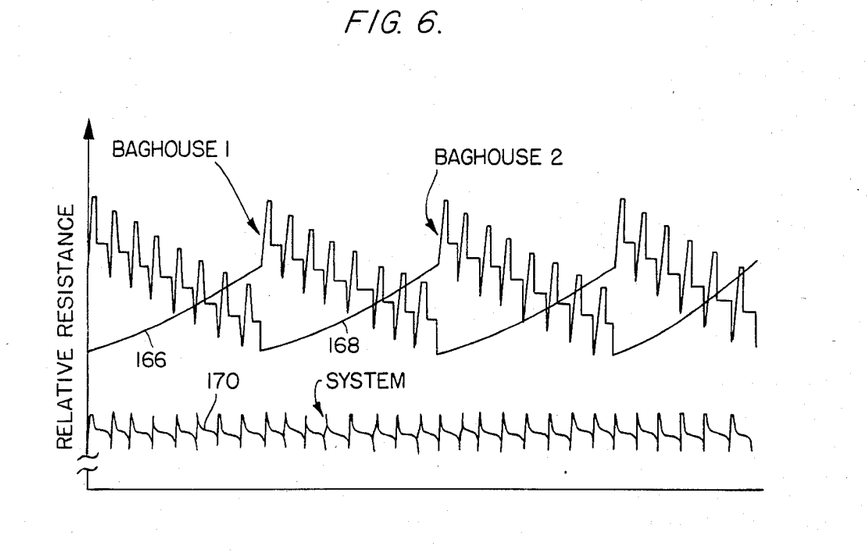
FIG. 6 is a waveform depicting gas flow resistance as a function of time resulting from the cleaning cycle of FIG. 5, FIG. 6 depicting the gas flow resistance attributable to each of the individual baghouses, as well as the resultant system resistance.

In FIG. 6 lines 166 and 168 represent the contributions to relative resistance or systems pressure loss of each of the two baghouses. In addition, the resultant system relative resistance or pressure loss is represented by line 170.

Two benefits in particular may be seen from FIG. 6. First, peak resistance or pressure losses as a result of the two baghouses do not occur simultaneously. With peak resistances offset, the peak pressure drop is reduced. Moreover, the resultant difference in fabric filter pressure loss from peak to minimum is less than if the peak resistance occurred simultaneously, making the system fans easier to operate.

Secondly, average fabric filter pressure loss is reduced, since air flow resistances do not add linearally.

Figure 7:
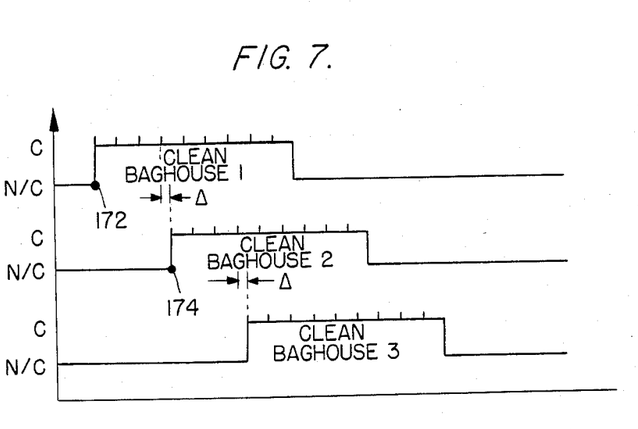
FIG. 7 is a representative timing diagram depicting the respective durations of the cleaning cycles of each individual baghouse in a three-baghouse system.

FIG. 7 depicts the manner in which the cleaning cycles in a three-baghouse system may be staggered in accordance with the invention. As depicted in FIG. 7, the cleaning cycles of the three baghouses (illustrated as each having a 100% margin) are initiated such that the individual cleaning cycles of the bag houses overlap in time. Moreover, since, as depicted in FIG. 7, the cleaning cycles of two or even three of the baghouses are at times overlapping, an offset delay, Δ, is provided to ensure that the time of peak gas flow resistance of one baghouse compartment does not coincide with the time of peak gas flow resistance of another baghouse compartment. More particulary, in FIG. 7 the cleaning of the first baghouse is initiated at point 172. The cleaning of a second bag house is initiated at point 174, approximately one-third of the duration of a baghouse cleaning cycle later. However, and even more particularly, the cleaning cycle of the second bag house initiated at point 172 is initiated following a delay equal to an integer multiple of the time duration of single compartment cleaning sub-cycle, e.g. the 4.5 minute cleaning sub-cycle time of FIG. 2, plus a single offset delay, Δ, within a single compartment cleaning sub-cycle, from the beginning of the single compartment cleaning sub-cycle to at least the point where reverse gas flow is removed. With the particular compartment cleaning sub-cycle depicted in FIG. 2, the offset delay Δ would be in the order of 90 seconds, so that the fourth compartment of the first bag house is in its settling interval, and thereby past the time of peak reverse gas flow, before the first compartment in the second bag house begins to be cleaned.

Figure 8:
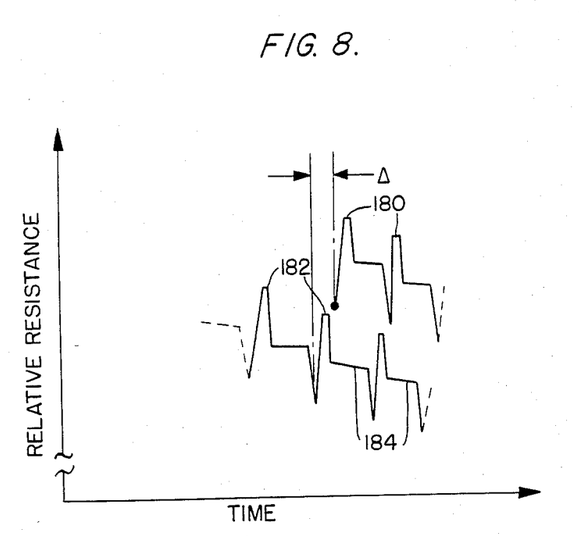
FIG. 8 shows expanded waveforms depicting the relative resistances attributable to two of the baghouses cleaned as depicted in FIG. 7, and showing in greater detail the manner in which the cleaning cycles are initiated at times which ensure that the time of peak gas flow resistance of one baghouse does not coincide with the time of peak gas flow resistance of another baghouse.

The expanded waveforms of FIG. 8 depict in somewhat greater detail the manner in which the start of a cleaning cycle in a second baghouse is delayed so that the peak resistance 180 caused by compartments in one baghouse being cleaned do not occur during the times of peak resistances 182 caused by compartments in another baghouse being cleaned but, rather, occur either during settling time intervals 184 or when the other baghouse is no longer being cleaned.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method of controlling the cleaning of a filter system of the type including a plurality of filter hoses, with each filter house arranged to receive particulate-laden gas from a source, and each filter house in turn including a common inlet manifold; a plurality of individual filter compartments each having an inlet duct for receiving particulate-laden gas from the common inlet manifold, an outlet duct for delivering filtered gas, a filter element between said inlet and outlet ducts, and a damper system for selectively blocking at least one of said ducts for taking the compartment off-line while other compartments of the particular filter house remain on-line; and a cleaning system common to the compartments of each filter house, each common cleaning system capable of being initiated to execute a filter house cleaning cycle and operable during a filter house cleaning cycle to clean the filter elements in a compartment-by-compartment sequence wherein each compartment being cleaned is off-line while other compartments are on-line; said method comprising:

initiating the cleaning cycles of individual filter houses at different times such that the filter house cleaning cycles are staggered, whereby the cleaning cycles are initiated at times which ensure that the time of peak gas flow resistance of one filter house does not coincide with the time of peak gas flow resistance of another filter house.

* * * * *